United States Patent
Klinefelter et al.

(10) Patent No.: US 6,570,109 B2
(45) Date of Patent: May 27, 2003

(54) QUICK SHUT-OFF EXTENDED RANGE HYGROSCOPIC RAIN SENSOR FOR IRRIGATION SYSTEMS

(75) Inventors: Paul A. Klinefelter, Richmond, VA (US); Barbara A. Coppola, Fuquay-Varina, NC (US); Craig S. Gardner, Clayton, NC (US); Philip H. Warren, Jr., Apex, NC (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

(21) Appl. No.: 10/053,100

(22) Filed: Oct. 26, 2001

(65) Prior Publication Data

US 2003/0079974 A1 May 1, 2003

(51) Int. Cl.[7] ............................................... H01H 35/00
(52) U.S. Cl. ............................. 200/61.04; 200/61.06; 200/61.07
(58) Field of Search .................... 73/73, 170.17; 137/78.1–78.3, 78.5; 200/61.04, 61.06, 61.07; 239/63, 64, 67; 340/603, 604

(56) References Cited

U.S. PATENT DOCUMENTS

| | | | | |
|---|---|---|---|---|
| 2,688,056 A | * | 8/1954 | Kettering et al. | 200/61.06 |
| 3,808,385 A | | 4/1974 | Klinefelter | 200/61.04 |
| 5,101,083 A | * | 3/1992 | Tyler et al. | 200/61.04 |
| 5,836,339 A | | 11/1998 | Klever et al. | 137/78.2 |

* cited by examiner

*Primary Examiner*—Michael Friedhofer
(74) *Attorney, Agent, or Firm*—Michael H. Jester

(57) ABSTRACT

A micro-switch is mounted within a housing and is electrically connectable to an irrigation controller. The switch has a spring biased actuating lever pivotable between ON and OFF positions. A single disc made of a hygroscopic material is mounted within the housing adjacent the inner end of the lever for absorbing rainfall and rapidly expanding a sufficient amount to move the actuating lever from its ON position to its OFF position to thereby cause the watering program of the irrigation controller to be interrupted. A stack of moisture absorptive discs made of the same hygroscopic material is mounted in the housing adjacent an outer end of the lever. When the stack of discs receives rainfall it slowly expands and maintains the actuating lever in its OFF position after the single hygroscopic disc has dried and contracted to ensure that watering is not re-initiated too soon after a storm.

20 Claims, 4 Drawing Sheets

QUICK SHUT-OFF EXTENDED RANGE HYGROSCOPIC RAIN SENSOR FOR IRRIGATION SYSTEMS

BACKGROUND OF THE INVENTION

The present invention relates to irrigation systems, and more particularly, to rain sensors which interrupt the execution of a watering program by an electronic irrigation controller during periods of rainfall.

In many areas of the world, it is necessary to irrigate crops and landscaping due to inadequate seasonal rainfall. Within the past several decades electronically controlled irrigation systems have come into widespread use. They typically include a micro-processor based irrigation controller which executes a stored watering program for turning on and off valves connected to supply lines equipped with sprinklers. The watering program typically activates various zones during run cycles measured in minutes on selected days of the week. The watering program can be adjusted to accommodate seasonal variations in rainfall. However, due to the unpredictability of weather patterns in general, it is desirable to connect a rain or moisture sensor to an electronic irrigation controller so that the sprinklers will not be turned on while it is raining, and for some time period thereafter before the rainfall has either evaporated or soaked into the ground. By interrupting a watering program of an electronic irrigation controller during, and shortly after, a period of rainfall, both purified and reclaimed water can be conserved thus lessening the demand on purification plants, reservoirs and other artificial delivery systems.

Rain sensors and moisture responsive actuators have been developed for use in connection with electronic irrigation controllers. One type of rain sensor operates in response to the weight of rainfall collected in a receptacle. However, this type of rain sensor is adversely affected by wind conditions and the collection of debris, and is too slow in reactivating the watering program. Its evaporative rate is not adjustable. Subterranean moisture sensors have also been developed for use with irrigation controllers. However, they are expensive, unreliable and subject to breakdowns. Rainfall sensors have also been developed which utilize infrared emitter and detector devices that optically detect the presence of collected rainfall. See for example U.S. Pat. No. 5,836,339 of Klever et al. entitled Raindrop Counter and Control System for Irrigation Control Systems. However, these devices are relatively complex and expensive. Another category of rain sensor which has been widely commercialized under the MINI-CLIK® trademark utilizes a plurality of stacked discs made of a hygroscopic material. The discs expand in response to contact with rain water to depress a spring biased switch to deactivate the watering program of the electronic irrigation controller. When the rain stops, the hygroscopic discs eventually dry out and contract, thereby releasing the switch to re-activate the watering program. See for example U.S. Pat. No. 3,808,385 of Klinefelter entitled Moisture Responsive Switch Actuator.

While rain sensors utilizing hygroscopic discs have proven to be inexpensive and reliable, their principle drawback is that while accumulating rainfall, the sprinkler system can still be running, giving the perception that water is being wasted or that the rain sensor is broken. In addition, they tend to reset too quickly, even after heavy rainfall.

SUMMARY OF THE INVENTION

It is therefore the primary object of the present invention to provide an improved, low-cost, reliable rain sensor for use with irrigation controllers.

In accordance with the present invention a rain sensor for use with an irrigation control system includes a housing and an electric switch mounted within the housing. The switch has a spring biased actuating lever movable between a first position in which the switch is in a first state and a second position in which the switch is in a second state. A first moisture absorptive element is mounted within the housing adjacent a first opening therein for receiving rainfall and rapidly expanding a sufficient amount to move the actuating lever of the switch from its first position to its second position. A second moisture absorptive element is mounted in the housing for receiving rainfall through a second opening in the housing for slowly expanding and maintaining the actuating lever of the switch in its second position after the first moisture absorbing element has dried and contracted.

DESCRIPTION OF THE PREFERRED EMBODIMENT

Figure 1:
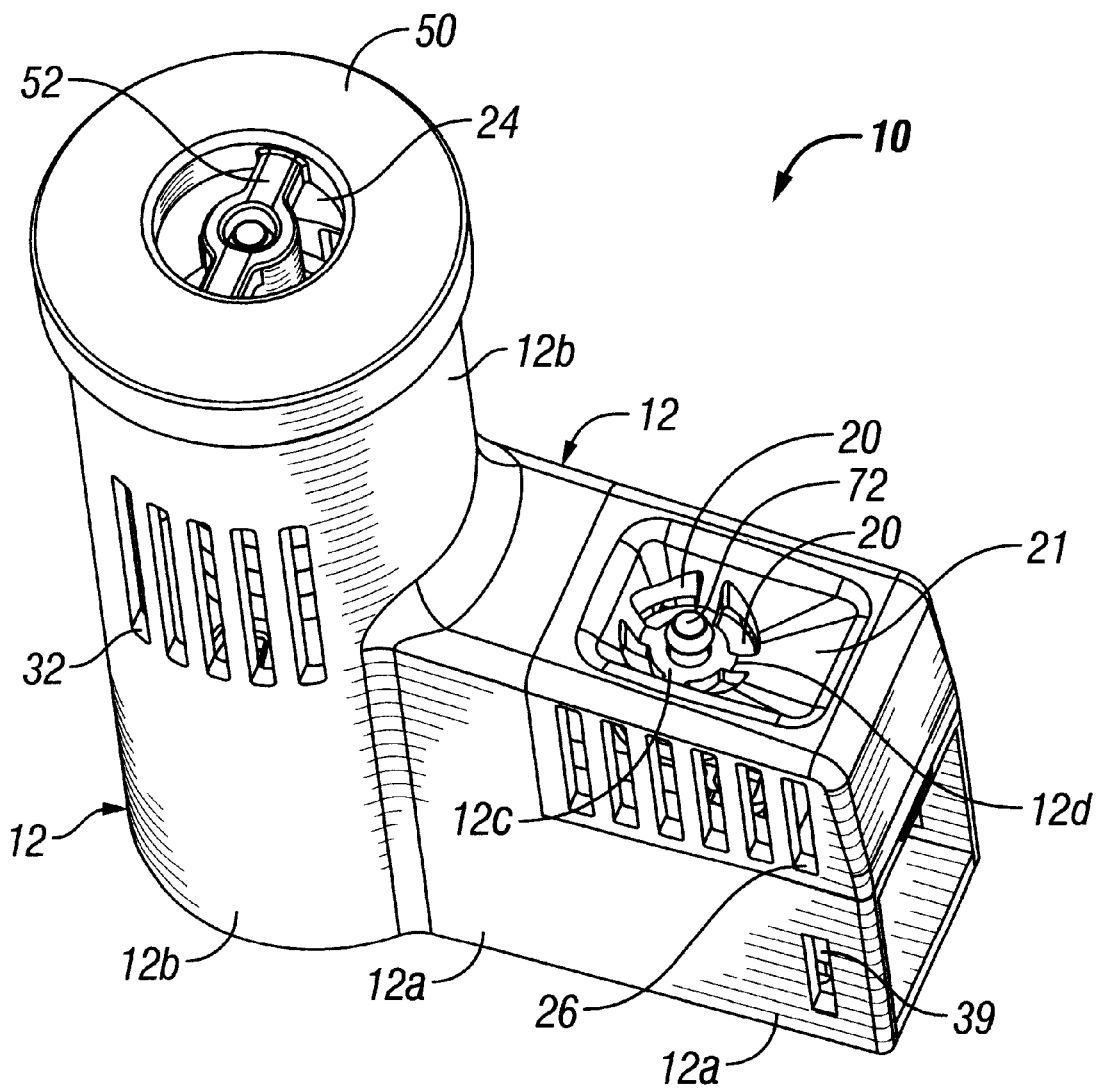
FIG. 1 is a perspective view of a self-adjusting rain sensor looking down at one side of the rain sensor from above.

Referring to FIG. 1 a self-adjusting rain sensor 10 for use with a conventional irrigation control system (not illustrated) includes a housing 12 and an electric switch 14 (FIGS. 2 and 3) mounted within the housing 12. The switch 14 has a spring biased actuating member in the form of a lever 16 that is movable by pivoting or swinging between a first position in which the switch is in a first state and a second position in which the switch is in a second state. A first moisture absorptive element in the form of a single hygroscopic disc 18 (FIG. 2) is mounted within the housing 12 beneath a plurality of first openings 20 in a funnel shaped basin 21 formed an upper side of the housing 12 for receiving rainfall. The basin 21 collects rainfall and directs it to the single disc 18. The single disc 18 rapidly expands vertically a sufficient amount to move the actuating lever 16 of the switch 14 from its first position to its second position. A second moisture absorptive element in the form of a stack 22 (FIG. 2) of eight individual hygroscopic discs 22a is mounted in the housing 12 for receiving rainfall through a second opening 24 in an upper side of the housing 12 for slowly expanding and maintaining the actuating lever 16 of the switch 14 in its second position after the single disc 18 has dried and contracted.

The switch 14 is preferably a conventional water-proof micro-switch except that its actuating lever 16 is extended well beyond the rectangular base 14a of the switch 14. This configuration avoids limiting the range of expansion of the stack 22 of hygroscopic disks to the "over-travel" distance inherent in the micro-switch. The switch 14 is in an open state when in its first position in which the outer end actuating lever 16 is at or near its maximum height. This open state is sensed by the electronic irrigation controller as an ON position. Conversely, the switch 14 is in a closed state when in its second position in which the actuating lever 16 has been moved downwardly through a predetermined angle. This closed state is sensed by the electronic irrigation controller as an OFF position. It is important to understand that the actuating lever 16 is made of resilient flexible metal. The single disc 18 is positioned closely adjacent to the hinged inner end 16a (FIG. 2) of the actuating lever 16 so that its rapid vertical expansion is sufficient to depress the inner end 16a of the actuating lever 16 enough to move the lever 16 to its OFF position. The stack 22 of discs 22a expands more slowly and eventually its vertical expansion is sufficient to push the outer end 16b (FIG. 3) of the lever 16 and hold it down for a prolonged period, even after the single hygroscopic disc 18 has dried out. With our invention, the rain sensor 10 thus stays OFF in better proportion to the total amount of rain received over the course of a day or several days.

Figure 2:
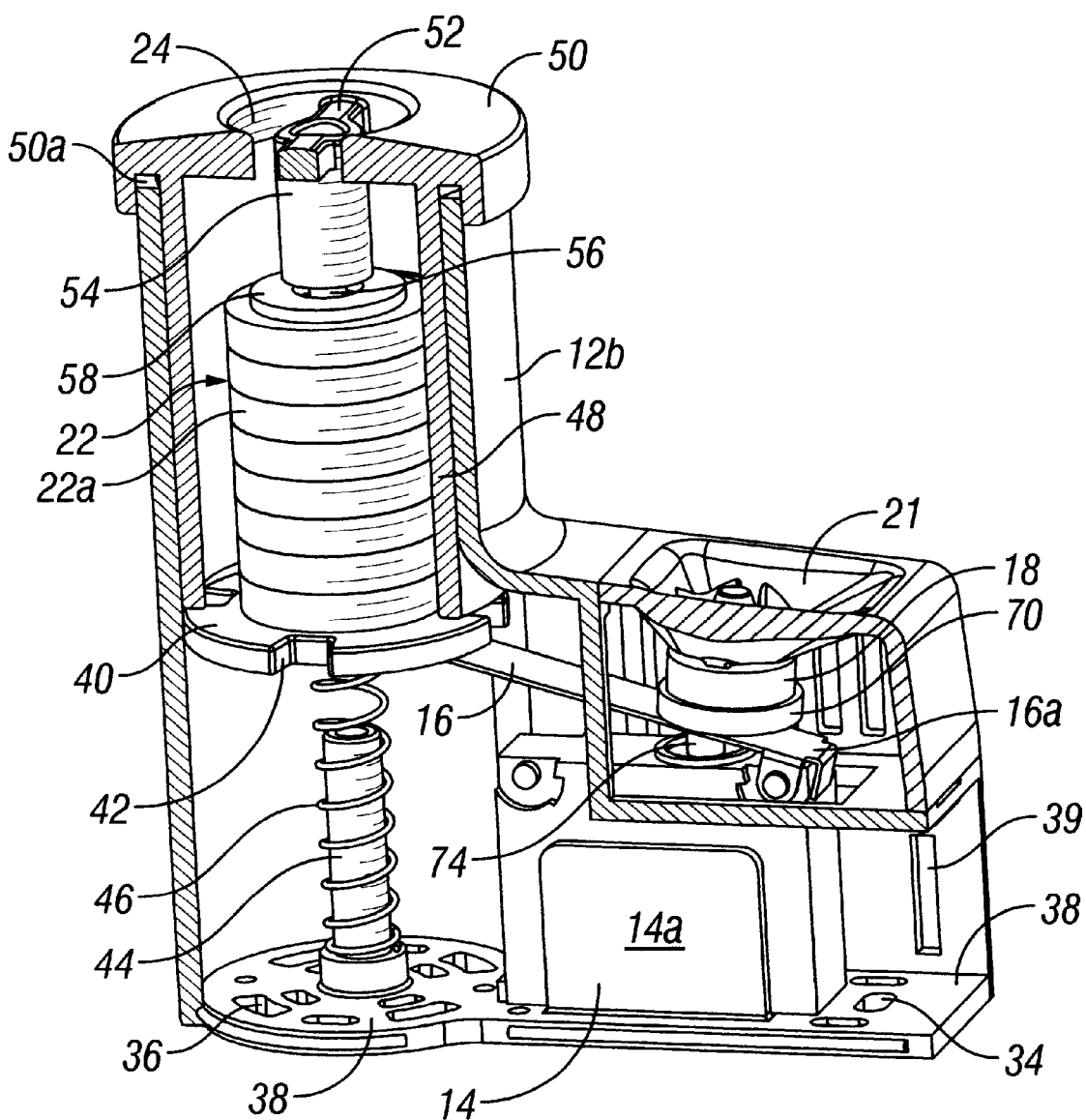
FIG. 2 is a vertical section of the self-adjusting rain sensor illustrating details of its internal construction.
Figure 3:
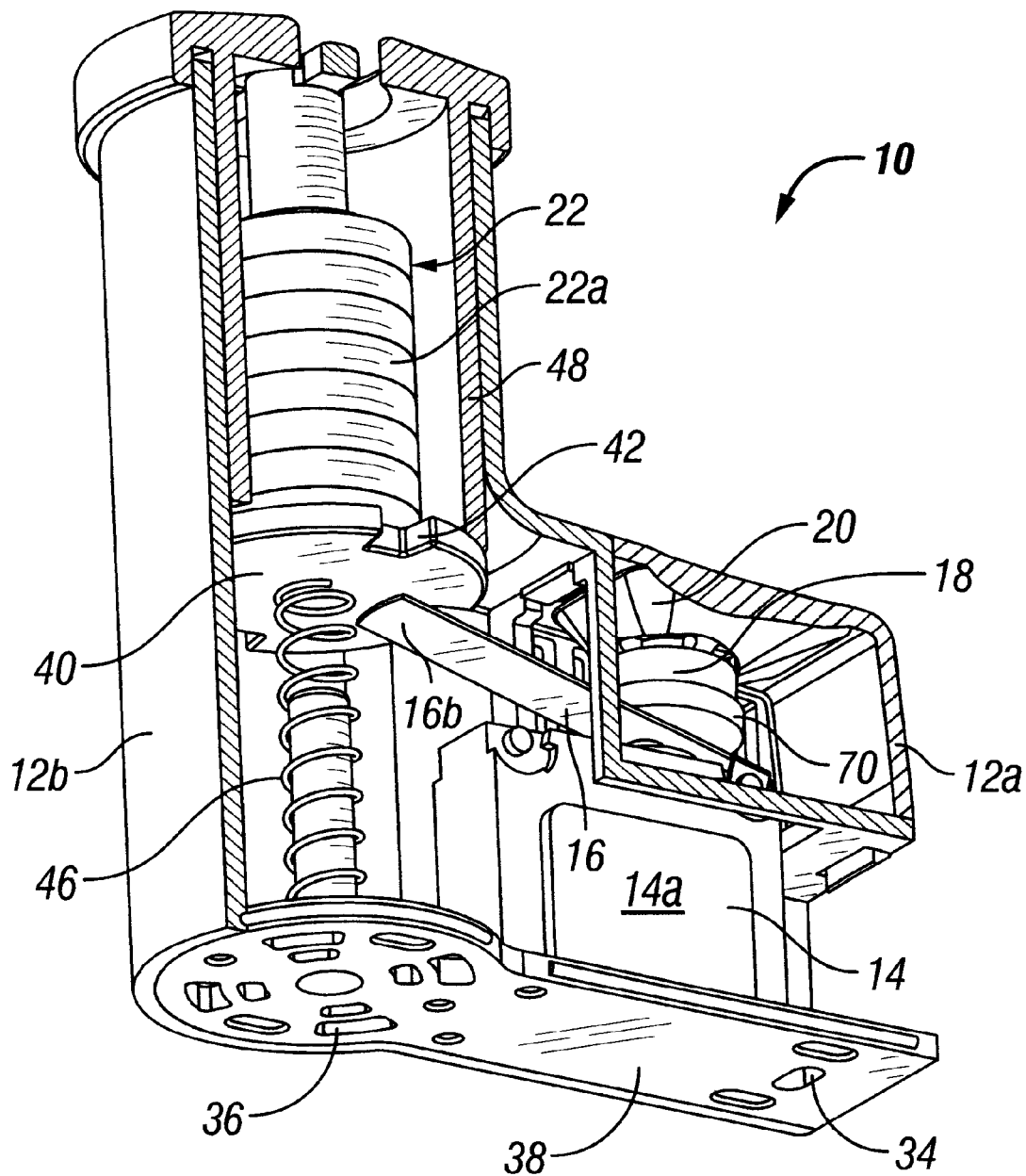
FIG. 3 is a view of the self-adjusting rain sensor similar to FIG. 2 but taken from a lower angle to illustrate further details of the self-adjusting rain sensor.

The housing 12 (FIG. 1) is preferably made of injection molded plastic and includes a hollow rectangular portion 12a the encloses the switch 14 and single hygroscopic disk 18 and a taller cylindrical portion 12b that encloses the stack 22 of hygroscopic discs 22a. As illustrated in FIGS. 2 and 3, the hollow interior of the rectangular portion 12a of the housing 12 communicates with the hollow interior of the cylindrical portion 12b of the housing 12. The long actuating lever 16 extends from the rectangular housing portion 12a into the cylindrical housing portion 12b. The rectangular housing portion 12a is formed with a plurality of vertical slots 26 (FIG. 1) on opposite sides thereof. The cylindrical housing portion 12b is formed with a plurality of vertical slots 32 on opposite sides thereof. The slots 26 and 32 facilitate ventilation to allow the single hygroscopic disc 18 and the stack 22 of hygroscopic discs 22a to dry out once the rainfall has ceased. Holes 34 and 36 (FIG. 2) formed in the bottom wall 38 of the housing 12 allow rainfall that has entered the holes 20 and 24 and has not been absorbed by the hygroscopic discs 18 or 22a to flow out of the housing 12. The housing portions 12a and 12b are preferably integrally formed and snap onto the bottom wall 38 to facilitate opening the rain sensor 10 to repair or replace its internal parts.

A pair of vertical slots 39 (FIGS. 1 and 2) are formed in opposite side walls of the rectangular housing portion 12a for facilitating attachment to a pivoting mounting extension bracket (not illustrated). This facilitates mounting the rain sensor 10 in the outdoors, to an exterior structure, such as the outside wall of a garage or a fence. The rain sensor 10 is preferably mounted close to the irrigation controller so that only a short length of double stranded wire need be used to make the required electrical connection between the terminals of the switch 14 and the circuitry of the controller.

The single hygroscopic disc 18 and the plurality of hygroscopic discs 22a that make up the stack 22 are preferably the same thickness, and are made of the same hygroscopic material. However, the disc 18 and the discs 22a have different diameters. A material that is a mixture of untreated wood fibers compressed together to form what looks like brown cardboard has been found to have the correct water absorption, expansion and contraction properties, as well as durability. One suitable commercially available material is Kraft Press Board, refined from one-hundred percent pure cellulose pulp.

The stack 22 of hygroscopic disks 22a is supported by a circular platform 40 (FIGS. 2 and 3) with four equally spaced notches 42 formed in the periphery thereof to allow for drainage of excess rainfall. A vertical guide stop 44 extends upwardly from the bottom wall 38 in the center of the cylindrical portion 12b of the housing 12. A coil spring 46 surrounds the vertical guide stop 44 and is compressed between the bottom wall 38 and the circular platform 40 to bias the stack 22 of hygroscopic discs 22a upwardly. An inner cylindrical mounting sleeve 48 snugly and slidingly fits within the upper portion of the cylindrical portion 12b of the housing 12. A circular knob 50 is integrally molded to, and extends across the upper end of, the cylindrical mounting sleeve 48. The knob 50 is formed with a downwardly opening annular groove 50a for receiving the upper end of the housing portion 12b. The mounting sleeve 48 preferably has cut away regions that allow the knob 50 to be rotated to vary the number of the vertical slots 32 (FIG. 1) that are covered. This permits the user to select quicker or longer dry-out times.

The circular opening 24 (FIG. 1) is formed in the knob 50 and allows rainfall to enter the cylindrical housing portion 12b and be absorbed by the stack 22 of hygroscopic discs 22a. The hygroscopic discs 22a (FIGS. 2 and 3) are formed like washers, i.e. they each have a center hole. A cross-piece 52 (FIG. 1) extends diametrically across the circular opening 24. A centrally located cylindrical guide piece 54 (FIG. 2) extends downwardly from the cross-piece 52 and receives the upper end of a cylindrical mounting rod 56. The upper end of the mounting rod 56 may have male threads so that it can be screwed into female threads formed in a downwardly opening vertical bore (not visible) in the guide piece 54. A washer 58 is first installed over the mounting rod 56 before the washer shaped hygroscopic discs 22a are installed over the rod 56 to form the stack 22. The circular platform 40 pushes the disc stack 22 and the washer 58 against the guide piece 54.

The single hygroscopic disc 18 (FIG. 2) has a washer shape. An upwardly opening cylindrical mounting dish 70 surrounds the lower end of the disc 18. A pin 72 (FIG. 1) with a flared upper end extends through the central opening (not visible) in the disc 18. The lower end of the pin 72 is threaded, welded, glued or otherwise secured to the mounting dish 70. The flared upper end of the pin 72 is forced through a small hole in a central portion 12c of the housing 12 that is supported by a plurality of ribs 12d that define the rainfall openings 20 in the funnel shaped basin 21. The upper end of the pin 72 is flared so that it can be forced through the small hole but cannot be easily pulled out of the hole. The switch 14 is mounted in the rectangular portion 12a of the housing 12 beneath the basin 21 so that when the single hygroscopic disc 18 expands the it will push the dish 70 against the upper side of the hinged inner end 16a of the switch actuating lever 16. The lower side of the inner end 16a will eventually depress a spring biased push button 74 (FIG. 2) of the switch 14 a sufficient amount to turn the switch 14 to its OFF state. As the disc 18 expands and contracts it is free to slide along the length of the shaft of the pin 72 which extends through the hole in the center of the disc 18.

Figure 4:
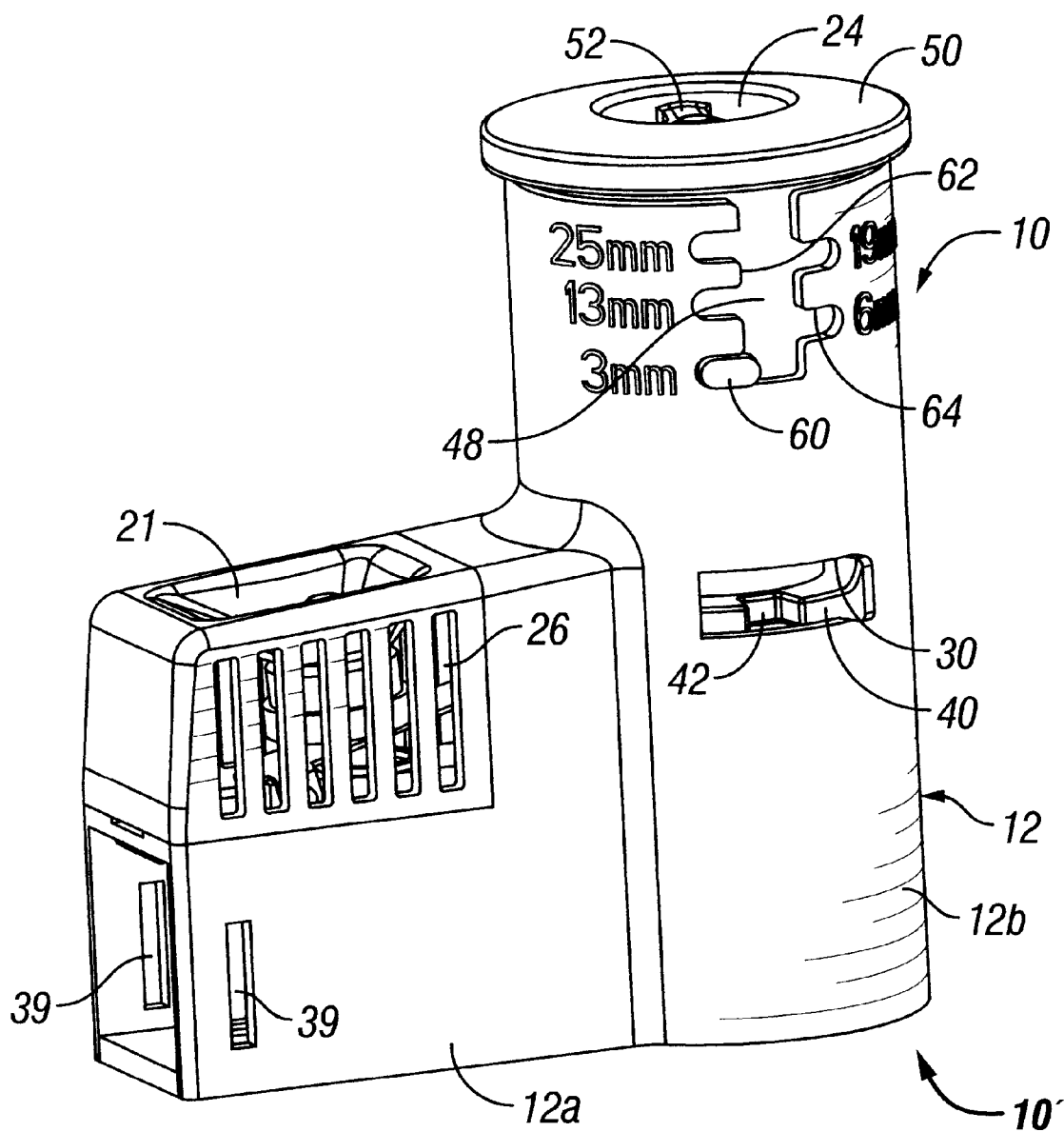
FIG. 4 is a perspective view of a manually adjustable rain sensor.

FIG. 4 illustrates an alternate embodiment in the form of a manually adjustable rain sensor 10' that incorporates means for pre-selecting a vertical height or position of the stack 22 of hygroscopic discs 22a within the cylindrical housing portion 12b. This will pre-determine the amount of rainfall that will maintain the switch 14 in its OFF position. The rain sensor 10 of FIGS. 1–3 and the rain sensor 10' of FIG. 4 share many common parts, as indicated by the like reference numerals. The mounting sleeve 48 is formed with an oval-shaped projection 60. The cylindrical housing portion 12b is formed with a relatively large vertical slot 62 that opens through the side of the upper end of the housing portion 12b. A plurality of vertically staggered, horizontally extending registration notches 64 are formed in the housing portion 12b and communicate with the vertical slot 62 . In the illustrated embodiment of the manually adjustable rains sensor 10' there are five registration notches 64. The knob 50 can be gripped between the thumb and index finger of a user to rotate the knob 50 and the mounting sleeve 48 to which it is connected. This disengages the projection 60, which is also connected to the sleeve 48 from its current notch, labeled "3 mm" in FIG. 4, and moves the projection 60 into the slot 62. The knob 50 can be pulled up and rotated to insert the projection 60 into one of the other registration notches 64. This locks the stack 22 of hygroscopic discs 22a in a higher position thus requiring a larger amount of rainfall in order for the stack 22, when it swells, to hold the switch 14 in its OFF state. As the hygroscopic discs 22a expand and contract, they are free to slide along the mounting rod 56.

Thus our rain sensors 10 and 10' can provide a quick turn OFF feature since only the single hygroscopic disc 18 needs to absorb a relatively small amount of rainfall to expand sufficiently to depress push button 74 to change the state of the switch 14. This can occur during the first five to ten minutes of a storm. On the other hand, as more and more rain falls during the storm, the stack 22 of eight hygroscopic discs 22a will eventually absorb enough rainfall, e.g. over a two to four hour time period, to hold down the outer end 16b of the switch lever 16 to maintain the switch 14 in its OFF state, even after the single disc 18 has dried out and contracted to the point where it would no longer hold the switch 14 in its OFF state. The first and second water absorptive elements 18 and 22 are laterally spaced apart and expand and contract vertically. A key to the design of our rain sensors 10 and 10' is that the water absorption capacity of the stack 22 is substantially greater than the water absorption capacity of the single disc 18. Another key is that the single disc 18 is positioned to apply a first force against the inner end 16a of the lever 16 when the disc 18 expands and the stack 22 is positioned to apply a second force against the outer end 16b of the lever 16 when the plurality of discs 22a collectively expand. Thus the hygroscopic properties, as well as the configuration and the positioning of the first and second water absorptive elements 18 and 22 are important to the rapid turn OFF and extended time duration OFF capability of our rain sensors 10 and 10'.

It is embarrassing, wasteful and costly to have an automatic irrigation system that is watering turf and vegetation during a rain storm. When appropriately connected to an electronic irrigation controller, our rain sensors 10 and 10' rapidly shut off watering as soon as a rain storm commences. Our rain sensors 10 and 10' also keep the sprinklers from watering not only while it continues to rain, but after the rain has ceased for a time period sufficient so that watering does not re-commence until the rainfall around the vegetation has largely dissipated through evaporation or otherwise. In other words, appropriately adjusted, our rain sensors 10 and 10' keep the irrigation controller from watering until the lawn and soil surrounding the landscape vegetation has dried out, but not so long that the lawn gets brown spots or plants begin to wilt or die.

The hygroscopic discs 22a in the stack 22 absorb water and expand proportionally to the amount of rain that fell. For example, a small cloudburst would result in little absorption, and a thunderstorm with two inches of rainfall would lead to much more absorption and expansion. Of course, dry-out time for the stack 22 depends upon the relative temperatures, humidity and wind conditions. However, this is beneficial since there is a direct correlation between dry-out time and the need to re-commence watering to avoid damage to the turf or other landscaping due to insufficient ground water. If only the single hygroscopic disc 18 were utilized, the irrigation controller would allow watering to re-commence way too soon. If only the stack 22 of hygroscopic discs were utilized, it would take too much rain and/or too long before watering were interrupted Our rain sensors thus represent a significant improvement over the hygroscopic rain sensor disclosed in the aforementioned U.S. Pat. No. 3,808,385 of Glenn B. Klinefelter. Our rain sensors are inexpensive to manufacture and they are extremely reliable and long lasting. The housing 12, sleeve 48 and knob 50 can be inexpensively injection molded from suitable UV resistant thermoplastic material. The waterproof micro-switch 14 can be purchased commercially from many different vendors with the custom, extended length actuating lever 16 specified for this special application. In other words, the actuating lever 16 extends well beyond the perimeter of the rectangular base 14a of the switch 14. The hygroscopic discs 18 and 22a can be die cut from sheet stock of the same hygroscopic material.

While we have described preferred embodiments of our quick acting, extended duration rain sensor, it will be apparent to those skilled in the art that our invention can be modified in both arrangement and detail. For example other shapes and sizes of moisture absorbing elements could be used to achieve the twin actuation function that provides a quick turn OFF and an extended OFF condition. The switch 16 could be actuated from an open to a closed state upon disc expansion, or visa versa. The type of switch could be varied to include other types of push button switches, membrane switches, slide switches, toggle switches, and so forth. The configuration of the housing and its openings could be widely varied. The threshold switch closure rainfall amount could be continuously adjustable instead of merely adjustable in discrete increments. Therefore the protection afforded our invention should only be limited in accordance with the scope of the following claims.

What is claimed is:

1. A rain sensor for use with an irrigation control system, comprising:

a housing;

an electric switch mounted within the housing and having a spring biased actuating member movable between a first position in which the switch is in a first state and a second position in which the switch is in a second state;

a first moisture absorptive element mounted within the housing adjacent a first opening therein for receiving rainfall and rapidly expanding a sufficient amount to move the actuating member of the switch from the first position to the second position; and a second moisture absorptive element mounted in the housing for receiving rainfall through a second opening in the housing for slowly expanding and maintaining the actuating member of the switch in the second position after the first moisture absorbing element has dried and contracted.

2. The rain sensor of claim 1 and further comprising means for pre-selecting a position of the second moisture absorptive element in the housing to pre-determine an amount of rainfall that will maintain the actuating member of the switch in the second position.

3. The rain sensor of claim 1 wherein the first moisture absorptive element is made of a hygroscopic material.

4. The rain sensor of claim 1 wherein the second moisture absorptive element is made of a hygroscopic material.

5. The rain sensor of claim 1 wherein the first and second moisture absorptive elements are made of a hygroscopic material.

6. The rain sensor of claim 1 wherein the first and second moisture absorptive elements are each made of discs made of a hygroscopic material.

7. The rain sensor of claim 1 wherein the housing has a basin formed in an upper side thereof for collecting and directing water to the first moisture absorptive element.

8. The rain sensor of claim 1 wherein a water absorption capacity of the second element is substantially greater than a water absorption capacity of the first element.

9. The rain sensor of claim 1 wherein the first and second moisture absorptive elements are each made of discs made of a hygroscopic material, and the second element is made of a stack of a plurality of discs.

10. The rain sensor of claim 1 wherein the switch is a micro-switch and the actuating member is a hingedly connected actuating lever that pivots relative to a base of the micro-switch.

11. A rain sensor for use with an irrigation control system, comprising:
a switch having an actuating member movable between a first position in which the switch is in a first state and a second position in which the switch is in a second state, the actuating member being biased to the first position;
a first moisture absorptive element having a first water absorption capacity, and being dimensioned, configured and positioned in a first location to receive rainfall and expand a sufficient amount to move the actuating member of the switch from the first position to the second position; and
a second moisture absorptive element having a second water absorption capacity greater than the water absorption capacity of the first element, and the second element being dimensioned, configured and positioned in a second location to receive rainfall and expand and maintain the actuating member of the switch in the second position after the first moisture absorbing element has dried and contracted so that it would no longer maintain the switch in the second position by itself.

12. The rain sensor of claim 11 and further comprising means for pre-selecting a position of the second moisture absorptive element in the housing to pre-determine an amount of rainfall that will maintain the actuating member of the switch in the second position.

13. The rain sensor of claim 11 and further comprising a housing for enclosing the switch and the first and second elements, the housing having at least one opening for allowing the first and second elements to receive rainfall that strikes an exterior of the housing.

14. The rain sensor of claim 13 wherein a position of the second element is manually adjustable within the housing for changing an amount of rainfall that will maintain the actuating member of the switch in the second position.

15. The rain sensor of claim 11 wherein the actuating member is a pivotable lever of a switch and the first element is positioned to apply a first force against an inner end of the lever when the first element expands and the second element is positioned to apply a second force against an outer end of the lever.

16. The rain sensor of claim 14 wherein the second element is supported on a spring biased platform.

17. The rain sensor of claim 16 wherein the housing includes a sleeve with a knob that can be rotated and vertically reciprocated relative to a portion of the housing enclosing the second element to adjust a height of the second element relative to the actuating member of the switch.

18. The rain sensor of claim 13 wherein the housing has a bottom wall with a plurality of drain holes and a plurality of side walls with slots formed therein to provide ventilation sufficient to allow the first and second elements to dry out.

19. The rain sensor of claim 11 wherein the first and second elements are laterally spaced apart and expand and contract vertically.

20. A rain sensor for use with an irrigation control system, comprising:
a housing having first and second laterally spaced apart rainfall openings;
a switch mounted in the housing and having an actuating member lever pivotable between an ON position and an OFF position, the actuating member being biased toward the ON position;
a first hygroscopic element having a first water absorption capacity and being positioned in the housing to receive rainfall passing through the first opening in the housing and expand a sufficient amount to move the actuating lever of the switch from the ON position to the OFF position;
a second hygroscopic element having a second water absorption capacity greater than the water absorption capacity of the first element, the second element being positioned in the housing to receive rainfall passing through the second opening in the housing and expand to maintain the actuating lever of the switch in the OFF position after the first element has dried and contracted so that it would no longer maintain the switch in the OFF position by itself; and
means for pre-selecting a position of the second element in the housing to pre-determine an amount of rainfall that will maintain the actuating lever of the switch in the OFF position.

* * * * *